United States Patent [19]

Morrill

[11] Patent Number: 4,688,324
[45] Date of Patent: Aug. 25, 1987

[54] ELECTRIC MOTOR ASSEMBLY

[76] Inventor: Wayne J. Morrill, King & Hamsher Sts., Garrett, Ind. 46738

[21] Appl. No.: 928,243

[22] Filed: Nov. 7, 1986

[51] Int. Cl.$^4$ ............................................ H02K 15/14
[52] U.S. Cl. ...................................... 29/596; 310/42; 310/90
[58] Field of Search .................... 29/596, 598; 310/42, 310/90

[56] References Cited

U.S. PATENT DOCUMENTS

| | | | |
|---|---|---|---|
| 2,522,985 | 9/1950 | Bradley | 310/51 X |
| 3,293,729 | 12/1966 | Morrill | 29/598 |
| 3,755,889 | 9/1973 | Busian | 29/596 |
| 3,874,073 | 4/1975 | Dochterman | 29/598 |
| 4,045,698 | 8/1977 | Morrill | 310/90 X |
| 4,209,722 | 6/1980 | Peachee, Jr. | 310/90 X |
| 4,499,661 | 2/1985 | Peachee, Jr. | 29/598 |
| 4,565,937 | 1/1986 | Uhen | 310/90 |

Primary Examiner—Carl E. Hall
Attorney, Agent, or Firm—Pearne, Gordon, McCoy & Granger

[57] ABSTRACT

A method for making a unit-bearing motor wherein a drawn steel cup-shaped frame has a base and a longitudinal axis, an elongated metallic post is shaped with an outer cylindrical mounting surface at a first end and disposed in a coaxial aperture in the frame base, an annular shoulder is formed on the metallic post adjacent the outer mounting area, and this shoulder abuts a mounting area surrounding the coaxial base aperture. A jig is used to locate the post coaxially in the cup-shaped frame, with the post first end in the base aperture and the shoulder abutting the mounting area, and then a brazing liquid, such as silver solder, is flowed into the space between the post and the base and allowed to harden to secure the post in the frame. The post has a journal bearing aperture to provide a unit bearing for a rotor cooperating with the stator carried in the frame.

12 Claims, 8 Drawing Figures

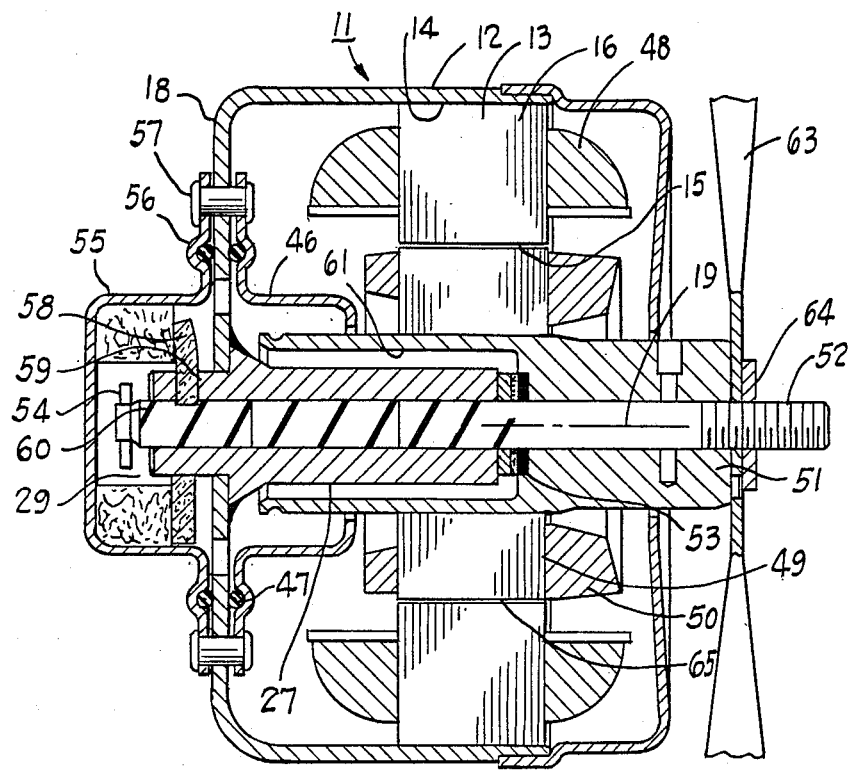
Fig. 1
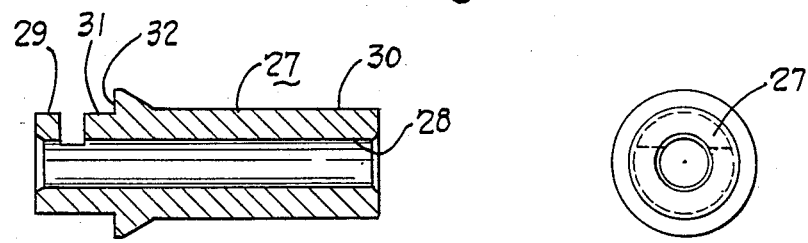
Fig. 6
Fig. 7
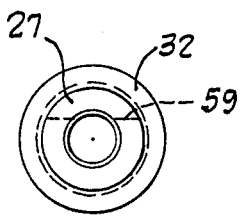
Fig. 8

ELECTRIC MOTOR ASSEMBLY

BACKGROUND OF THE INVENTION

Small electric motors have been made in two different types: a first type is two individual bearings supported at opposite ends of the frame to support and journal the rotor-mounted shaft; and a second type is a unit bearing motor wherein the frame carries a post at only one end which has an elongated unit bearing within to journal the shaft. These first and second types are shown in FIGS. 11 and 2, respectively, of U.S. Pat. No. 3,874,073. This patent utilized a frame made of resin and a particulate matter such as sand, with the frame supporting the magnetic stator of the motor. In unit-bearing motors, there was the difficulty of achieving uniform air gap between the stator and rotor, and U.S. Pat. No. 3,755,889 showed the use of shims to attempt to achieve this uniform air gap.

Another way to attempt to achieve a substantially uniform air gap was to utilize a cast or die-cast metal frame of iron or aluminum, with the frame supporting the magnetic stator and also having unitary therewith a central apertured post which had the unit bearing therein. This structure is shown in a number of patents, such as U.S. Pat. Nos. 2,522,985; 4,045,698; 4,209,722; and 4,499,661. U.S. Pat. No. 3,293,729 disclosed a combined frame and stator yoke made from a plurality of laminations so that it would carry magnetic flux, and this frame had welded thereto a unit bearing post to journal the rotor. U.S. Pat. No. 4,565,937 disclosed a unitbearing motor with a cast aluminum frame and then an insert bushing of a Babbitt sleeve or cast iron sleeve to provide the unit bearing for the rotor.

Where the unit-bearing frame is made from cast aluminum, an aluminum post results which has journal bearing qualitites inferior to cast iron. The patentees insert bushing of a Babbitt sleeve or cast iron sleeve to provide the unit bearing for the rotor.

Where the unit-bearing frame is made from cast aluminum, an aluminum post results which has journal bearing qualities inferior to cast iron. The patentees of U.S. Pat. No. 4,565,937 recognized this and provided an insert of a superior bearing material. However, this has the disadvantage of increased assembly problems, and with two dissimilar metals there are two different thermal expansion characteristics to increase the problems of attempting to obtain a substantially uniform air gap. Where the unitary frame and post are made from cast iron, this results in the disadvantage of being a large casting which must be machined at the inner stator mounting area to be able to receive the stator laminations and then be machined at the journal bearing aperture. In the prior art, these two machined portions have been machined with the same chucking in order to achieve the best concentricity. However, this means that the machining of the journal bearing aperture is accomplished at a low speed to accommodate the proper surface cutting speed at the stator mounting area. Also, such castings, whether aluminum or cast iron, are relatively expensive because they are larger than the stator diameter and require machining in order to be able to be used.

SUMMARY OF THE INVENTION

The problem to be solved, therefore, is how to construct a unit-bearing motor at a lower cost by a minimization of the required machining and yet achieve a motor wherein the rotor is highly concentric with the stator bore.

This problem is solved by a frame assembly for a unit-bearing electric motor, comprising in combination a cup-shaped drawn steel frame having an inside diameter adapted to receive a magnetically permeable stator with a bore, said cup-shaped frame having a longitudinal axis extending through the base of the cup, a mounting area substantially coaxial on said base, a surface defining a coaxial aperture in said base mounting area, an elongated metallic post having first and second ends and a central longitudinal journal bearing aperture therethrough, an outer mounting surface on said post first end concentric with said journal bearing aperture and received in said base aperture, shoulder means on said post adjacent to said first end outer mounting surface, and means securing said post outer mounting surface in said frame aperture at said shoulder means to have the post journal bearing aperture coaxial with the axis of said frame within 0.002 inch, whereby said post may journal a unit bearing shaft of a rotor the external diameter of which has an air gap concentric with the bore of the stator within 0.004 inch.

The problem is further solved by a unit-bearing motor having a stator inside a cup-shaped frame with a base and a longitudinal axis, a post secured at a first end thereof to the base, and a journal aperture in the post journaling a rotor, characterized in that the frame is a drawn steel cup, the post is a metal post formed separately from the frame and subsequently secured in a substantially coaxial aperture in the base, and at least one shoulder on the post abuts a mounting area surrounding the base aperture.

The problem is still further solved by the method of making a unit-bearing motor having a rotor on a shaft and a stator, comprising the steps of drawing a cup-shaped steel frame having an inner stator support area adapted to receive a magnetically permeable stator with a bore, said cup-shaped frame having a longitudinal axis and a base unitary with the frame, forming a mounting area centrally in said base, forming a substantially coaxial aperture in said base mounting area, providing an elongated metallic post having first and second ends and a central longitudinal journal bearing aperture therethrough, forming an outer mounting surface on said post first end concentric with said journal-bearing aperture, forming shoulder means on said post near said outer mounting surface, placing said outer mounting surface of said post in said base aperture with said shoulder means abutting said mounting area and with said post substantially concentric with the inner stator support area of said frame, securing said post in said frame base aperture and journaling a unit-bearing shaft of a rotor in said post aperture with the external diameter of the rotor establishing an air gap substantially concentric with the stator bore.

Accordingly, an object of the invention is to provide a frame for a unit-bearing electric motor which includes a metal post mounted inside a drawn steel frame.

Another object of the invention is to provide a metal post with a shoulder which abuts a flat surface on the base of a cup-shaped drawn steel frame, and then the post is secured to the cup-shaped base at this shoulder.

Another object of the invention is to provide a metal post in a cup-shaped drawn steel frame with the post extending through an aperture in the base and closely received at a plurality of places around the periphery of the base aperture.

Other objects and a fuller understanding of the invention may be had by referring to the following description and claims, taken in conjunction with the accompanying drawing.

BRIEF DESCRIPTION OF THE DRAWINGS

FIG. 1 is a longitudinal, sectional view of a completed motor constructed in accordance with the invention;

FIG. 6 is a longitudinal, sectional view of the bearing post;

FIG. 7 is an end view of the bearing post of FIG. 6; and

FIG. 8 is an elevational view of the opposite end of the bearing post.

DESCRIPTION OF THE PREFERRED EMBODIMENT

Figure 2:
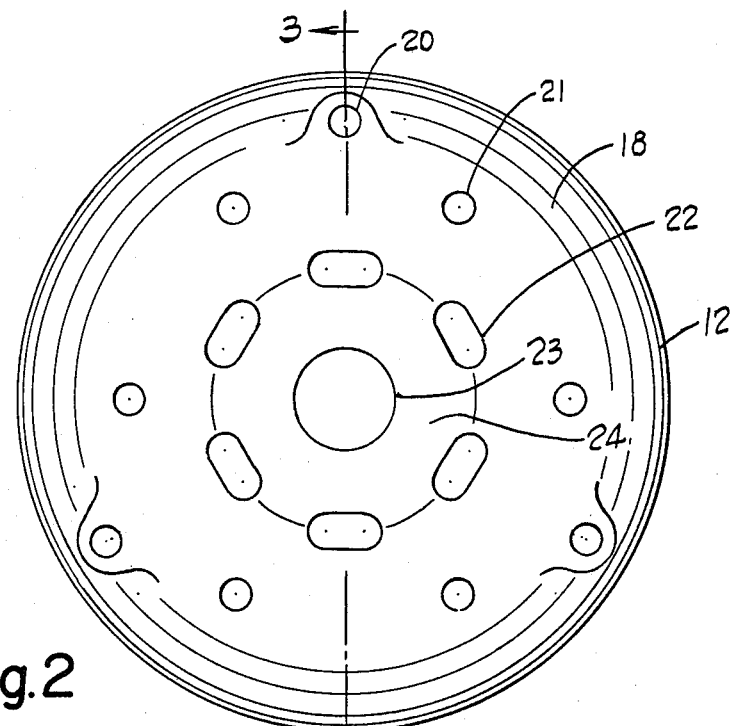
FIG. 2 is an end view of the cup-shaped frame of the motor of FIG. 1.

The drawing figures illustrate an electric motor 11 having a cup-shaped frame 12 mounting a laminated stator 13 at a stator mounting area 14. The stator has a bore 15 defining the magnetic poles and the outer portion of the stator constitutes a magnetic yoke 16 to carry the flux around to the other pole or poles of the stator. The frame 12 is made from a flat steel sheet drawn into a cup-shape, with a substantially closed base 18, and the frame has a longitudinal axis 19. As better shown in FIG. 2, the base 18 has mounting holes 20 to mount the motor 11, rivet holes 21 for the oil reservoir, oil return holes 22, and a substantially coaxial aperture 23 in the center of the base. This coaxial aperture 23 is formed in a mounting area 24 of the base which surrounds the coaxial aperture 23. In the preferred embodiment, the base 18 is substantially normal to the axis 19, and especially the mounting area 20 is normal to this axis.

Figure 3:
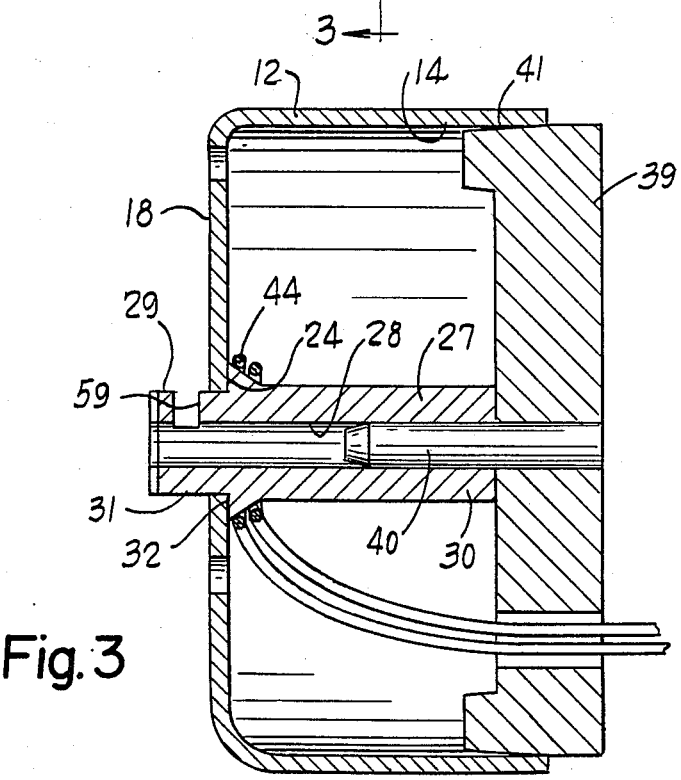
FIG. 3 is a sectional view on line 3—3 of FIG. 2 and showing a jig for orienting the bearing post.
Figure 4:
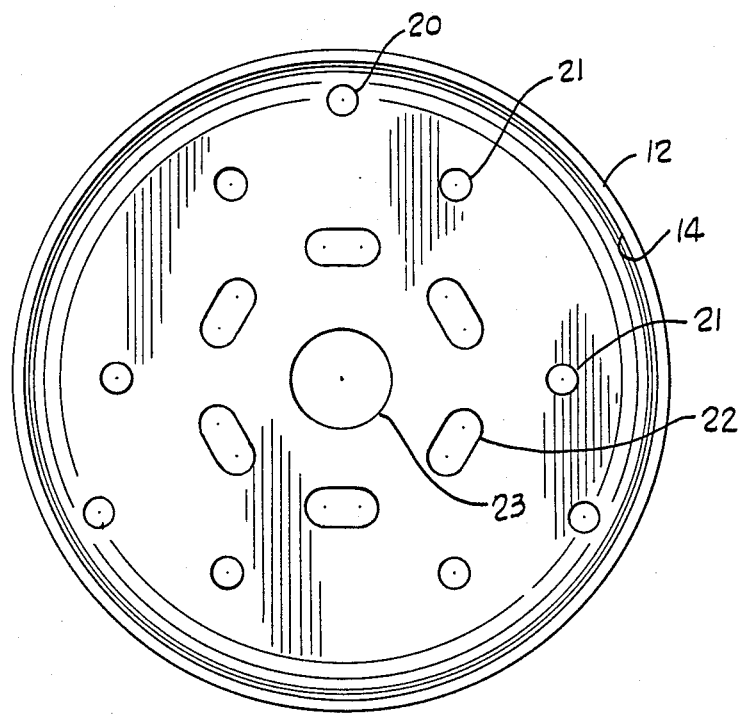
FIG. 4 is an end view of the cup-shaped frame opposite that end shown in FIG. 2.

An elongated metallic post 27 is shown in detail in FIGS. 6, 7, and 8, and is generally cylindrical with a coaxial journal bearing aperture 28. The post has a first end 29 and a second end 30. An outer mounting surface 31 is provided on the post first end 29 concentric with the journal bearing aperture 28, and in the preferred embodiment this is a cylindrical surface. Shoulder means 32 is provided on the exterior of the post 27 adjacent the outer mounting surface 31, and this shoulder means is adapted to abut the mounting area 24 on the base, as shown in FIG. 3. To this end, the shoulder means is adapted to be substantially parallel to the mounting area 24 and in this preferred embodiment, both are substantially normal to the axis 19.

The shoulder means 32 includes at least one shoulder, and preferably at least three areas on the shoulder means are adapted to abut at least three corresponding portions of the mounting area 24. In the preferred embodiment, this shoulder means is an annular shoulder to engage the substantially annular mounting area 24 surrounding the base aperture 23.

There is means securing the post 27 in the base aperture 23, and this is a material set up from or hardened from liquid. In the preferred embodiment, this is a brazing liquid, such as silver solder. The silver solder melts at a temperature below the relaxation temperature of either the cast iron post or the drawn steel shell so as to not affect the dimensional stability of either.

Figure 5:
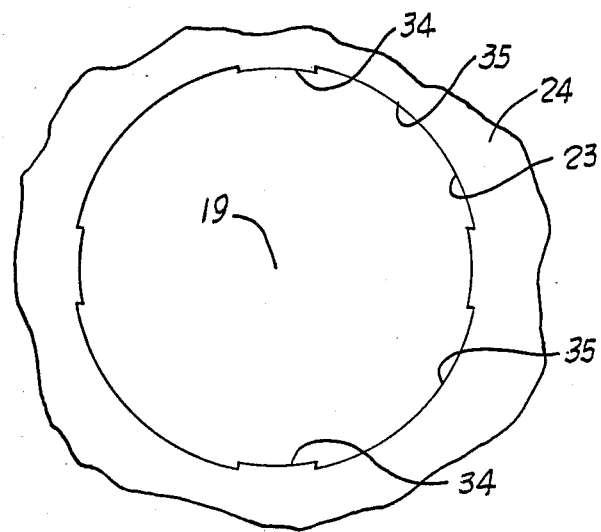
FIG. 5 is an enlarged view of the aperture in the base for the bearing post.

As shown in FIG. 5, the coaxial aperture 23 has a first plurality of portions 34 disposed on a first radius from the axis 19, and has a second plurality of portions 35 disposed on a second, slightly greater radius from the axis 19. The portions 34 and 35 alternate around the periphery of this aperture 23. The first plurality of portions 34 may be three or more, four being shown, and these define a very close tolerance sliding fit with the outer mounting surface 31 on the post 27. This sliding fit may have a tolerance of ±0.0005 inch. The plurality of second portions 35 may have about 0.002 inch greater clearance, and this provides clearance for the flow of the silver solder between the outer mounting surface 31 of the post and the coaxial aperture 23 and also between the shoulder means 32 on the post and the mounting area 24. Accordingly, two things are accomplished: one, the precise positioning of the first end of the post 27; and second, the establishment of quick and proper flow of silver solder to perform the securing of the post to the frame base, because the cast iron post is easily wetted by the solder.

By the use of a large tonnage press, the various holes and apertures may be formed in the frame base 18 and the cup-shape of the frame drawn at the same time to assure concentricity of the base aperture 23 relative to the stator mounting area 14. Also, the plurality of portions 34 and 35 may also be formed at the same time or, alternatively, the base aperture 23 may be formed circular and then the second plurality of portions 35 shaved in a subsequent operation.

FIG. 3 illustrates the assembly of the post 27 into the frame 12, and this is accomplished by use of a jig 39 with a central stud 40 on which the journal bearing aperture 28 of the post 27 is received. The jig 39 also has outer locating arms 41, which may be slightly tapered, to enter into and be centered on the outer end of the cup at the stator mounting area 14. This assures concentricity of the second end 30 or right end of the post 27 as viewed in FIG. 3. The first end of the post 29, which is at the left end of FIG. 3, is centered by the coaxial base aperture 23, and since it is quite distant from the stator mounting area 24, any lack of concentricity is dissipated by a factor of about 5:1 because this base aperture is about 5 times further removed from the open end of the cup-shaped frame than the thickness of the stator stack of laminations.

A two-turn high frequency induction coil 44 is used in the preferred embodiment to rapidly heat the first end 29 on the post 27 at the shoulder means 32, and also to heat the adjoining mounting area 24 of the base. This heating to silver soldering temperature may be accomplished in a matter of seconds, so that there is a minimization of oxidation and also the heat is localized. As soon as the silver solder has flowed into place, the high frequency heating current may be terminated, and then the heat rapidly flows out of the solder area due to the good heat conductivity of the drawn steel frame 18 and cast iron post 27. This causes the silver solder rapidly solidify to secure the post 27 in place.

The silver soldering is performed at a low enough temperature to avoid any distortion of either the frame or the post. The stator laminations have a light press-fit in the stator mounting area 14, and any distortion in the frame 12 as these laminations are pushed into the frame occurs only at the outer peripheral edge of the base 18 rather than at the mounting area 24; hence, this does not provide any distortion for the mounting of the post 27.

With the jig 39 and heating coil 44 withdrawn, an oil catcher 46 with an O-ring 47 may be mounted inside the frame 12. After the oil catcher 46 is put in place, the stator laminations 13 may be pressed in place, and the stator laminations would have the stator winding 48 in place. Further, the drawn steel frame requires no machining. All holes and apertures may be punched with the same press which draw-forms this cup-shaped frame. The only machining is on the metallic post, which is small in diameter; hence, this machining may be done at a high rpm for a saving of time. The assembly of the post to the frame is easily and rapidly accomplished with the high frequency heating, melting of the silver solder, and subsequent solidification of the silver solder to complete the bonding. This results in a considerable saving in cost of manufacture, and with the cast iron post a superior being structure is achieved for long life.

A rotor 49 is shown as a laminated rotor having a cast squirrel cage 50 for operation of the motor as an induction motor. The laminated rotor 49 is mounted on a hub 51, which in turn is secured on a shaft 52 which may be journaled in the journal bearing aperture 28. One or more thrust washers 53 may be disposed between the second end 30 of the post 27 and the inner surface of the hub 51. A retaining washer 54 may be secured by any suitable means to the left end of the shaft 52, as shown in FIG. 1. Suitable lubrication is provided for the motor 11, e.g., by a lubricant retainer cap 55 containing an O-ring 56, and secured in any suitable manner to the outer portion of the frame base. This retention may be by rivets 57, which secure not only the retainer cap 55 but also the oil catcher 46.

Suitable lubrication is provided for the motor 11, e.g., by a wick 58 which is disposed in a groove 59 in the first end 29 of the post 27. Also, a helical groove 60 in the outer surface of the shaft 52 forms a viscosity pump to move oil from the lubricant reservoir of the retainer cap 55 toward the right in FIG. 1, where it moves by centrifugal force to the inner surface 61 of the hub 51, and then is known out into the oil catcher 46, where it returns to the lubricant reservoir 55 through the oil return holes 22. The rotor 51 may drive a suitable load, such as a fan blade 63 secured by a nut 64.

In practice, it has found that the post 27 secured in the frame 12 may be secured in a highly precise manner so that the journal bearing aperture 23 is coaxial with the axis 19 in the frame within ±0.001 inch, and this results in the rotor having an air gap 65 relative to the stator bore 15 which is concentric within ±0.002 inch. Because of this close tolerance, the air gap may be made quite small without danger of the rotor rubbing on the stator. For example, the air gap may be made 0.003 inch.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The method of making a unit-bearing motor having a rotor on a shaft and a stator, comprising the steps of:
   drawing a cup-shaped steel frame having an inner stator support area adapted to receive a magnetically permeable stator with a bore;
   said cup-shaped frame having a longitudinal axis and a base unitary with the frame;
   forming a mounting area centrally in said base;
   forming a substantially coaxial aperture in said base mounting area;
   providing an elongated metallic post having first and second ends and a central longitudinal journal bearing aperture therethrough;
   forming an outer mounting surface on said post first end concentric with said journal-bearing aperture;
   forming shoulder means on said post near said outer mounting surface;
   placing said outer mounting surface of said post in said base aperture with said shoulder means abutting said mounting area and with said post substantially concentric with the inner stator support area of said frame;
   securing said post in said frame base aperture; and
   journaling a unit-bearing shaft of a rotor in said post aperture with the external diameter of the rotor establishing an air gap substantially concentric with the stator bore.

2. The method as set forth in claim 1, wherein said steel frame is drawn from a flat steel sheet.

3. The method as set forth in claim 1, wherein said base is formed to be substantially closed except for said base coaxial aperture.

4. The method as set forth in claim 1, wherein said placing step includes locating said post relative to the inner stator support area of said frame.

5. The method as set forth in claim 1, wherein said mounting area is formed substantially normal to said axis.

6. The method as set forth in claim 5, wherein said shoulder means is formed substantially normal to said axis.

7. The method as set forth in claim 1, including forming said base aperture substantially circular.

8. The method as set forth in claim 7, including forming said base aperture wtih a plurality of first portions on a first radius from said axis and a plurality of second portions on a second slightly larger radius from said axis.

9. The method as set forth in claim 8, wherein said first and second portions alternate around the periphery of said base aperture.

10. The method as set forth in claim 9, wherein said plurality of second portions have small clearances with said post outer mounting surface, and said securing step includes an adhesive flowing through said small clearances.

11. The method as set forth in claim 10, wherein said securing step includes a flowing of a molten metal through said small clearances and a hardening of said molten metal.

12. The method as set forth in claim 11, wherein said securing step includes securing said shoulder means to said base mounting area.

* * * * *

UNITED STATES PATENT AND TRADEMARK OFFICE
CERTIFICATE OF CORRECTION

PATENT NO. : 4,688,324

DATED : August 25, 1987

INVENTOR(S) : Wayne J. Morrill

It is certified that error appears in the above-identified patent and that said Letters Patent is hereby corrected as shown below:

```
Column 1, line 32 "unitbearing"
   should be --unit-bearing--

Column 1
--delete the paragraph at about line 35 through line 39--

Column 3, line 45 "20"
   should be --24--

Column 4, line 63, after "silver solder"
   insert --to--

Column 5, line 21 "being"
   should be --bearing--

Column 5, line 45 "known"
   should be --thrown--

Column 5, line 49, after "has"
   insert --been--
```

UNITED STATES PATENT AND TRADEMARK OFFICE
CERTIFICATE OF CORRECTION

PATENT NO. : 4,688,324

DATED : August 25, 1987

INVENTOR(S) : Wayne J. Morrill

It is certified that error appears in the above-identified patent and that said Letters Patent is hereby corrected as shown below:

Column 6, line 48 "wtih" should be --with--

Signed and Sealed this

Twenty-third Day of April, 1991

Attest:

HARRY F. MANBECK, JR.

*Attesting Officer*

*Commissioner of Patents and Trademarks*